United States Patent
Caillard et al.

(10) Patent No.: US 9,919,745 B2
(45) Date of Patent: Mar. 20, 2018

(54) REINFORCED MOTOR VEHICLE STRUCTURE

(71) Applicant: RENAULT s.a.s., Boulogne Billancourt (FR)

(72) Inventors: Jerome Caillard, Gif sur Yvette (FR); Christian Delord, Versailles (FR); Thierry Hlubina, Chaville (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 15/301,850

(22) PCT Filed: Mar. 27, 2015

(86) PCT No.: PCT/FR2015/050791
§ 371 (c)(1),
(2) Date: Nov. 1, 2016

(87) PCT Pub. No.: WO2015/150669
PCT Pub. Date: Oct. 8, 2015

(65) Prior Publication Data
US 2017/0183040 A1    Jun. 29, 2017

(30) Foreign Application Priority Data
Apr. 4, 2014    (FR) ...................................... 1453032

(51) Int. Cl.
*B62D 25/08*    (2006.01)
*B62D 27/02*    (2006.01)

(52) U.S. Cl.
CPC ......... *B62D 25/088* (2013.01); *B62D 25/085* (2013.01); *B62D 27/02* (2013.01)

(58) Field of Classification Search
CPC ..... B62D 25/088; B62D 25/085; B62D 27/02
(Continued)

(56) References Cited

U.S. PATENT DOCUMENTS

| | | | |
|---|---|---|---|
| 3,188,132 A | 6/1965 | Schwiering et al. | |
| 7,703,805 B2 * | 4/2010 | Sasaki | B62D 21/152 280/784 |
| 2008/0150326 A1 | 6/2008 | Maruyama et al. | |

FOREIGN PATENT DOCUMENTS

| | | |
|---|---|---|
| DE | 10 2007 024 565 A1 | 2/2008 |
| DE | 10 2009 036 495 A1 | 2/2011 |

(Continued)

OTHER PUBLICATIONS

International Search Report dated Jul. 14, 2015 in PCT/FR2015/050791, filed Mar. 27, 2015.
(Continued)

*Primary Examiner* — Dennis H Pedder
(74) *Attorney, Agent, or Firm* — Oblon, McClelland, Maier & Neustadt, L.L.P.

(57) ABSTRACT

A motor vehicle structure includes two left and right bell-shaped suspension element supports arranged inside a front compartment close to a bulkhead of the vehicle. The suspension element supports are respectively adjacent to side walls of the front compartment. Each of the suspension element supports includes an internal face opposite the side wall. The structure also includes left and right spacers that extend respectively between the left and right suspension element supports and the rigid cross member, in a substantially longitudinal direction. The spacers are respectively anchored to the internal faces of the two suspension element supports. The spacers each have a skirt-shaped edge that can be applied to the suspension element supports, and a folded edge extending between a free end and an opposing attachment end to be joined to the cross member. The spacers include a central portion joining the folded edge and the skirt-shaped edge together.

12 Claims, 2 Drawing Sheets

(58) Field of Classification Search
USPC .............. 296/187.09, 187.1, 203.01, 203.02, 296/193.09
See application file for complete search history.

(56) References Cited

FOREIGN PATENT DOCUMENTS

| | | |
|---|---|---|
| DE | 10 2012 208 903 A1 | 11/2013 |
| EP | 1 840 004 A1 | 10/2007 |
| FR | 2 985 458 A1 | 7/2013 |
| JP | 11-180343 A | 7/1999 |
| WO | WO 2011/113550 A1 | 9/2011 |

OTHER PUBLICATIONS

French Preliminary Search Report dated Oct. 30, 2014 in French Application 1453032, filed Apr. 4, 2014.

\* cited by examiner

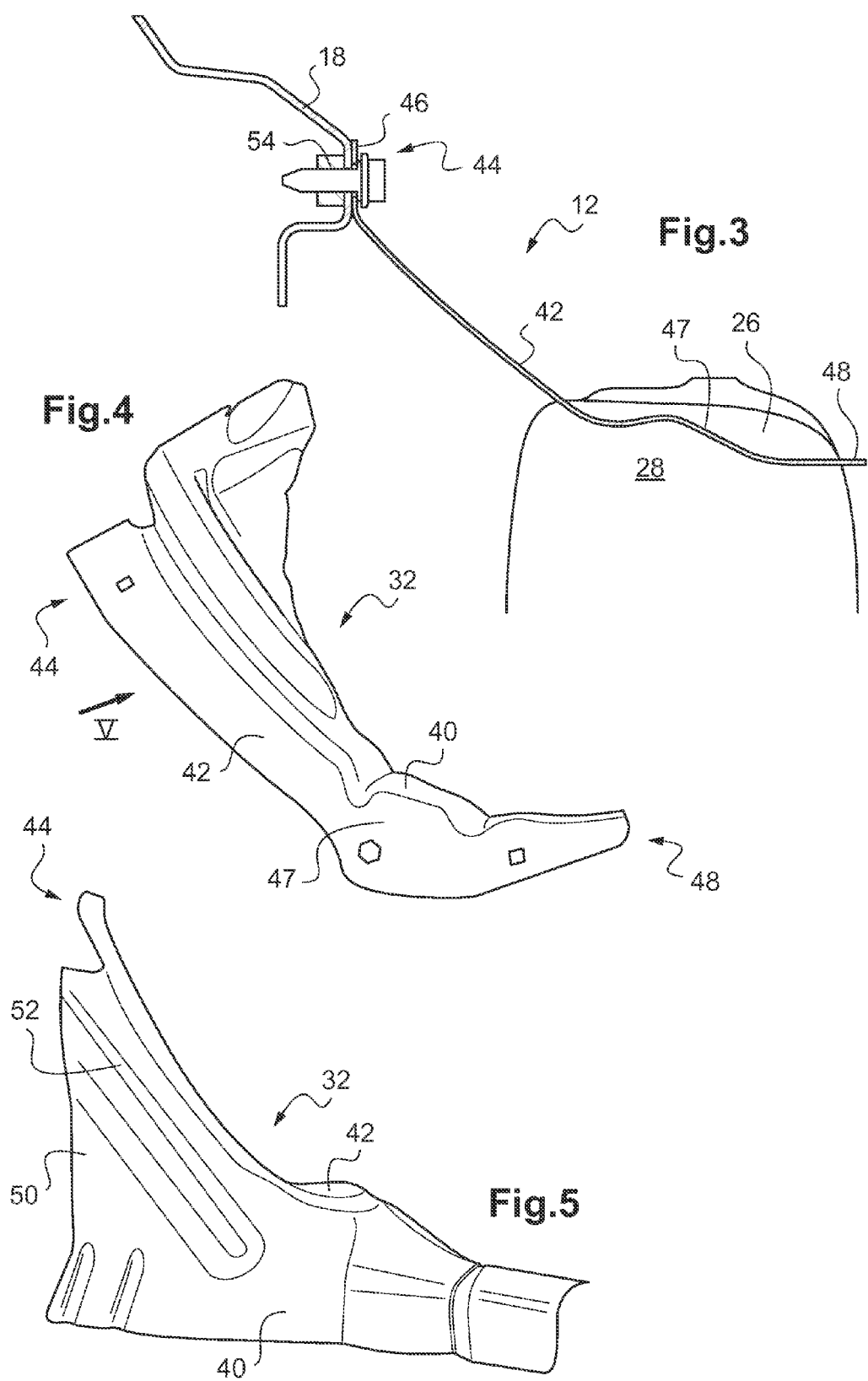

REINFORCED MOTOR VEHICLE STRUCTURE

BACKGROUND

The present invention relates to a motor vehicle structure including a bulkhead and two bell-shaped suspension element supports joined respectively to the bulkhead by spacers.

Normally, motor vehicle structures include a chassis and a body mounted on the chassis. Motor vehicle structures also have a front compartment designed to receive the engine, if said engine is front-mounted, and a passenger compartment separated from the front compartment by a bulkhead. Motor vehicle structures also have two bell-shaped suspension element supports arranged laterally inside the front compartment and close to the bulkhead. These two bell-shaped suspension element supports are designed to receive the shock absorber and spring elements of the suspension, when same is connected to the axle shafts. In particular, the upper portion of the supports forms a cover, specifically to bearingly receive the spring elements of the suspension.

The chassis has side members that extend longitudinally beneath the front compartment between the suspension element supports. Furthermore, the side members are mechanically joined to the suspension element support. Moreover, the bulkhead has a rigid cross member and two retaining spacers installed respectively between the two bell-shaped suspension element supports and the cross member. These retaining spacers are designed to retain the supports in the event of a frontal impact and to prevent same from entering the passenger compartment. Document WO2011/113550 describes such an arrangement. However, it has been observed that the side members drive the bell-shaped suspension element supports in rotation about a vertical axis and in movement towards one another and towards the passenger compartment in the event of a frontal impact in which the side members are driven longitudinally towards the rear of the vehicle. Indeed, the two sides members move towards one another as the bell-shaped suspension element supports move away from one another, and as such—as same are deformed—the movement of the side members tends to generate stresses applied substantially tangentially to the internal face of the bell-shaped suspension element supports. In certain circumstances, a frontal impact also causes the bell-shaped suspension element supports to move along a vertical axis away from the chassis.

Furthermore, a problem that the present invention is intended to address is providing a motor vehicle structure that helps to better stabilize the bell-shaped suspension element supports in relation to the body in the event of a frontal impact.

BRIEF SUMMARY

For this purpose, the present invention proposes a motor vehicle structure comprising a front compartment having side walls, and a passenger compartment that is separated from said front compartment by a bulkhead, said bulkhead having a rigid cross member, said structure comprising two bell-shaped suspension element supports arranged inside said front compartment close to said bulkhead, and that are respectively adjacent to said side walls, said bell-shaped suspension element supports each having an internal face opposite the side wall, said structure also comprising spacers that extend between said bell-shaped suspension element supports and said rigid cross member, respectively, in a substantially longitudinal direction. Said spacers are respectively anchored to the internal faces of said two bell-shaped suspension element supports.

Thus, one feature of the invention lies in the anchoring of the spacers to the internal faces of the supports in order to prevent the supports from rotating in the event of a frontal impact as a result of the side members being deflected. This helps to limit the lateral movement of same in relation to the body during the impact. Furthermore, and as explained in greater detail in the remainder of the description, the spacers also help to limit the vertical movement of same.

Furthermore, said bell-shaped suspension element supports have respectively an upper portion forming a cover, and said spacers are anchored near to said covers. Consequently, the spacers absorbed the stresses around the most rigid portion of the bell-shaped suspension element supports. Moreover, the covers directly receive the suspension elements from the inside of the supports. Thus, a portion of the stresses transmitted by the suspension elements is absorbed by the spacers and therefore by the cross member of the bulkhead.

Furthermore, said bell-shaped suspension element supports are rigidly connected to said side walls respectively. Consequently, the bell-shaped suspension element supports are held not only at the internal face of same but also at the opposing face of same by the side walls of the front compartment. Being held in a static position in relation to the body at two points helps to improve the strength of the bell-shaped suspension element supports in the event of a frontal impact.

According to a particularly advantageous embodiment of the invention, said spacers each have a skirt-shaped edge that can be applied to said bell-shaped suspension element supports. The shape of the skirt-shaped edge matches the shape of the supports, thereby improving the attachment between the spacers and the supports.

Furthermore, each of said spacers advantageously has a folded edge extending between a free end and an opposing attachment end that is designed to be joined to said cross member. In addition to the attachment function, the folded edge also helps to stiffen the spacer. Furthermore, said spacers preferably have a substantially triangular central portion joining said folded edge and said skirt-shaped edge together. Consequently, the two opposing edges of the spacer, formed respectively by the folded edge and the skirt-shaped edge, stiffen same and enable the deformation of same to be limited in the event of an impact.

Preferably, said folded edge of said spacer has a curved portion that is located towards said free end and that extends substantially perpendicular to said skirt-shaped edge. This maximizes stiffening of the spacer. Moreover, said folded edge, towards said attachment end, has another curved portion lying in a plane substantially perpendicular to the plane defined by said curved portion located towards said free end.

According to a particularly advantageous embodiment of the invention, said attachment end has a perforated tab extending substantially perpendicular to said curved portion. The perforated tab is then joined flat to the cross member of the bulkhead using a screw member. According to another embodiment, the tab is not perforated and is welded to the cross member of the bulkhead.

Furthermore and according to a particularly advantageous variant embodiment, said spacers are formed from a single piece of pressed metal. This provides spacers at an advantageous cost. Furthermore, said spacers extending respectively between said two bell-shaped suspension element supports and said cross member are mirror images of one another. Consequently, the spacers are symmetrical in relation to one another about a midplane.

BRIEF DESCRIPTION OF THE DRAWINGS

Further details and advantages of the invention are set out in the description of a specific embodiment of the invention given below as a non-limiting example, with reference to the attached drawings in which:

FIG. 3 is a schematic longitudinal cross-sectional view of the elements shown in FIG. 2, FIG. 4 is a schematic top view of an element shown in the preceding figures, and FIG. 5 is a schematic side view taken along the arrow V of the element shown in FIG. 4.

DETAILED DESCRIPTION

In this text, the concepts of "front" and "rear" are used with reference to the conventional front-rear orientation of the vehicle. The longitudinal direction corresponds to the conventional front-rear orientation of the vehicle. The transverse direction is perpendicular to this longitudinal orientation. The vertical direction is perpendicular to the longitudinal and transverse directions.

Figure 1:
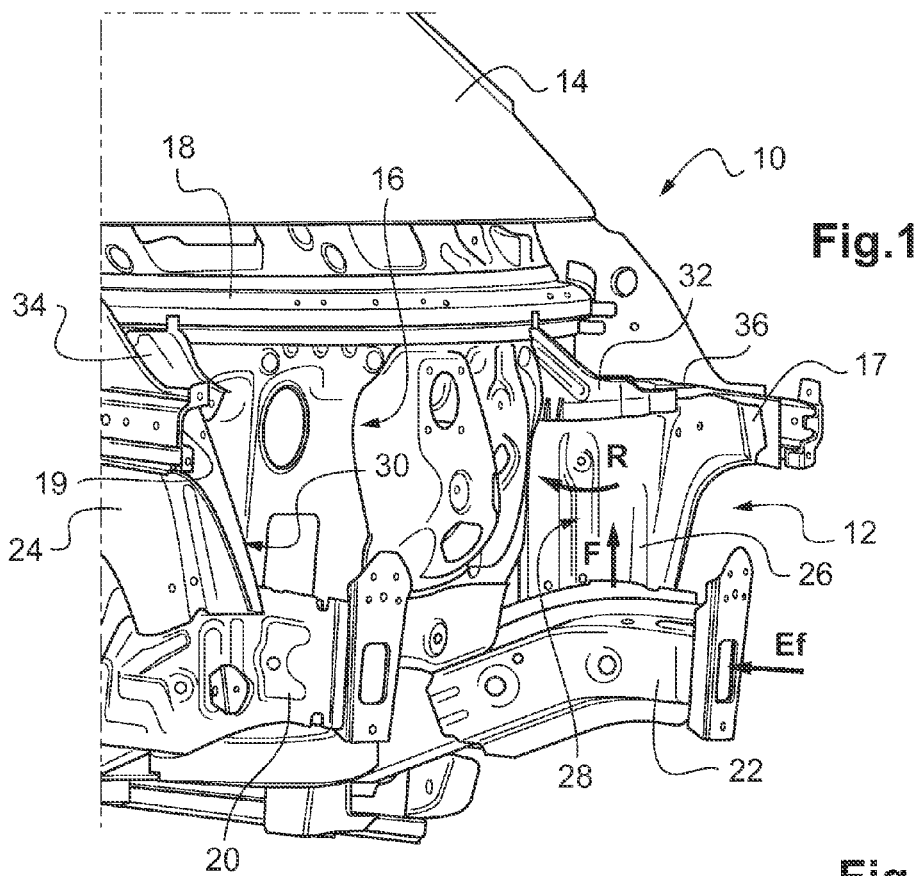
FIG. 1 is a partial schematic three-quarter front-right perspective view of a motor vehicle structure according to the invention.

FIG. 1 shows a portion of the front of a motor vehicle structure 10 according to the invention, The structure 10 includes a front compartment 12 and a passenger compartment 14 separated from one another by a bulkhead 16. The front compartment 12 has two side walls, a left-hand side wall 17 opposite a right-hand side wall 19. The bulkhead 16 has a rigid high cross member 18 extending transversely. The structure 10 has two side members, a right-hand side member 20 and a left-hand side member 22 extending in a longitudinal direction of the vehicle beneath the front compartment 12. Furthermore, bell-shaped suspension element supports, specifically one right-hand support 24 and one left-hand support 26, overhang on each side of the side members 20, 22. The left-hand bell-shaped suspension element support 26 has a left-hand internal face 28 and an opposing external face, concealed in FIG. 1, that is rigidly connected to the left-hand side wall 17. The bell-shaped suspension element supports 24, 26 are symmetrical with each other about a longitudinal and vertical plane lying between the side members 20, 22. Furthermore, the right-hand bell-shaped suspension element support 24 has a right-hand internal face 30 facing the left-hand internal face 28 of the left-hand bell-shaped suspension element support 26. Moreover, said support has an opposing external face rigidly connected to the right-hand side wall 19 of the front compartment 12.

Furthermore, each of the bell-shaped suspension element supports 24, 26 is joined to the rigid high cross member 18 by means of a retaining spacer, a left-hand spacer 32 for the left-hand support 26 and a right-hand spacer 34 for the right-hand support 24.

Figure 2:
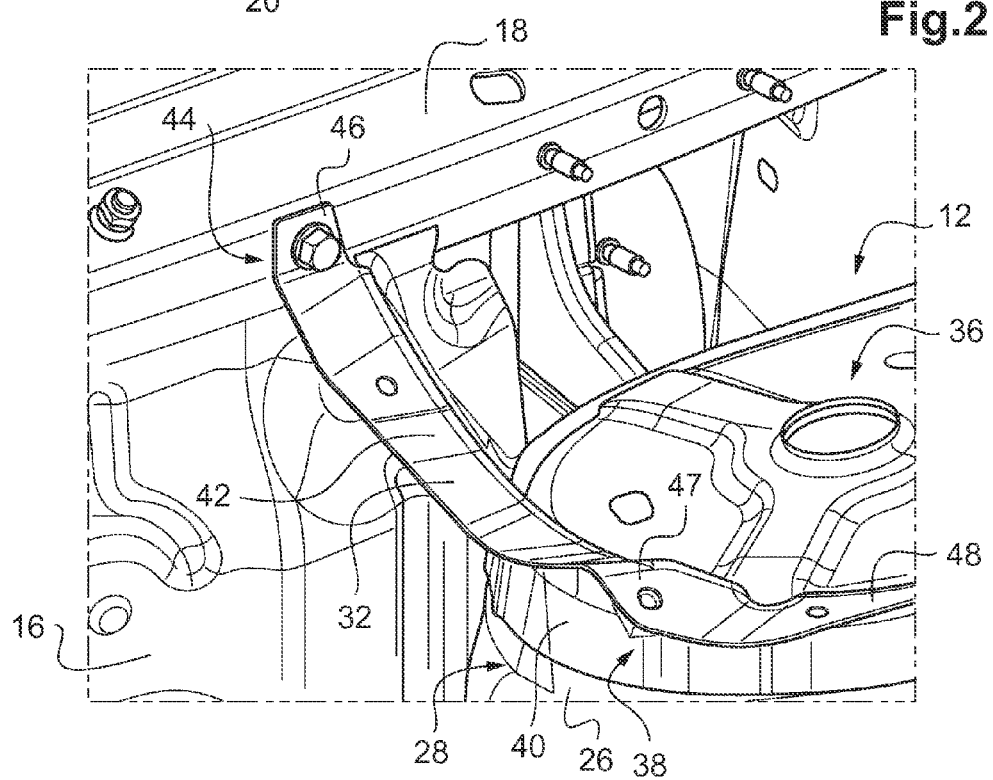
FIG. 2 is a schematic detail view of FIG. 1.

The arrangement described below for the left-hand spacer 32 applies by symmetry to the arrangement of the right-hand spacer 34, without moving outside the scope of the invention. Reference is made to FIG. 2, which shows in detail the left-hand spacer 32 installed between the rigid high cross member 18 of the bulkhead 16 and the left-hand bell-shaped suspension element support 26. This latter has a left-hand internal face 28 and an upper portion 36 forming a cover. This upper portion 36 forming a cover is designed to bearingly receive the suspension elements, from the inside of the bell-shaped suspension element support 26, specifically the elastic members, spring and shock absorber. Furthermore, the left-hand spacer 32 is anchored to the left-hand internal face 28 of the support 26 near to the upper portion 36 forming a cover.

The left-hand internal face 28 has a substantially cylindrical edge 38 near to the intersection with the upper portion 36 forming a cover, while the spacer 32 has a lower skirt-shaped edge 40, the shape of which perfectly fits a portion of the substantially cylindrical edge 38. The skirt-shaped edge 40 of the spacer 32 extends downwards. Furthermore, the spacer 32 has a folded edge 42 that has, at the rear portion of same, an attachment end 44 provided with a perforated tab 46, and an opposing free end 48. The folded edge 42 is located in an upper region of the spacer 32. The folded edge 42 has a curved first portion 47 that extends substantially perpendicular to the skirt-shaped edge 40 near to the left-hand internal face 28. The folded edge 42 has a curved second portion that extends between the curved first portion 47 and the attachment end 44, and the midplane of same is substantially perpendicular to the midplane defined by the curved first portion 47.

As detailed below, the perforated tab 46 of the attachment end 44 enables attachment to the cross member using a screw member 18. The perforated tab 46 is oriented substantially vertically and transversely. Said tab is applied against a front face of the rigid high cross member 18 of the bulkhead 16. According to another embodiment, the tab is not perforated and is spot- or seam-welded.

The skirt-shaped edge 40 is rigidly attached to the left-hand bell-shaped suspension element support 26, for example by means of a weld seam or spot welds. In another embodiment (not shown), the skirt-shaped edge 40 is attached using screws or rivets.

FIGS. 4 and 5 show the left-hand spacer 32 in detail from two different viewing angles. FIG. 4 shows the left-hand spacer 32 from below. The figure shows the folded edge 42 with a double curvature between the attachment end 44 of same and the free end 48 of same, and the skirt-shaped edge 40 that extends substantially perpendicular to the curved first portion 47 of the folded edge 42.

The left-hand spacer 32 is made of a single pressed metal part, for example steel.

FIG. 5 shows the left-hand spacer 32 from the side, and specifically the skirt-shaped edge 40 and the folded edge 42. The two edges 40, 42 are then joined together by a substantially triangular central portion 50 to form a single part. The substantially triangular overall shape can be seen mainly in a view corresponding to the arrow V in FIG. 5, i.e. in a transverse view of the vehicle. In other words, the folded edge 42 is located alongside an upper side of the triangle. The skirt-shaped edge 40 forms a lower side of the triangle and has a curved shape that fits the internal face 28 of the suspension element support. The skirt-shaped edge 40 is curved in a substantially horizontal plane to fit the convex shape of this internal face 28. A third side of the triangle located to the rear is applied against the bulkhead 16. The folded edge 42 is oriented towards the inside of the engine compartment, along a transverse direction of the vehicle. This folded edge ends at the rear with the attachment end 44 provided with the perforated tab 46.

With reference to FIG. 4, the third side of the triangle located to the rear of the central portion 50 has a conformation oriented towards the adjacent external side of the vehicle, determined in a transverse direction of the vehicle, this conformation bearing against the front partition of the bulkhead 16. This conformation is indeed oriented in the opposite direction to the folded edge 42, which is oriented towards the inside of the vehicle, i.e. towards the engine compartment. Consequently, the stresses are distributed on both sides of the central portion, firstly on the upper cross member 18 of the bulkhead, and secondly towards the bulkhead 16. The bulkhead is a structural partition separating the engine compartment from the passenger compartment.

The substantially triangular central portion 50 has a main rib 52 that is substantially parallel to the folded edge 42 in the portion of same that is located towards the attachment end 44. Such a main rib 52 helps to stiffen the left-hand spacer 32. Furthermore, the thickness of the spacer may be adapted as a function of the desired resistance to deformation. Therefore, without adding any bulk, it is easy to adjust the resistance to deformation of the spacer, and therefore the resistance to impact.

FIG. 3 is a partial cross-section of the attachment end 44 of the folded edge 42 and the tab 46 applied flat against the edge of the cross member 18 to be attached thereto using a screw member 54. The rigid high cross member 18 has a U-shaped profile in which the recess extends away from the front compartment 12, thereby increasing rigidity in the event of impact. The opposing free end 48 of the folded edge 42 and the curved portion 47 that partially surrounds the left-hand bell-shaped suspension element support 26, on the left-hand internal face 28 of same, are also shown.

The left-hand spacer 32 and the cooperation of same with the left-hand bell-shaped suspension element support 26 and the cross member 18 are described in detail above. The arrangement of the right-hand spacer 34 in cooperation with the right-hand bell-shaped suspension element support 24 and the cross member 18 is symmetrical about the longitudinal and vertical plane extending between the side members 20, 22 shown in FIG. 1.

The advantage of the positioning of the spacers 32, 34 is demonstrated with reference to FIG. 1.

Thus, in the event of a frontal impact, a force Ef is exerted longitudinally on the side members 20, 22. The consequences of such a force on the left-hand portion of the structure 10 are described below for the sake of clarity. Nonetheless, the consequences are identical on the right-hand portion. As a result, this force may have two consequences. Indeed, the side member 22 is rigidly connected to the left-hand bell-shaped suspension element support 26, and more specifically to the left hand internal face 28 of same. The left-hand bell-shaped suspension element support 26 is rigidly connected to the left-hand side wall 17 of the front compartment 12 by the external face of same opposite the internal face 28. Consequently, the force Ef exerted longitudinally on the left-hand side member 22 tends to exert a torque R about a vertical axis on the left-hand bell-shaped suspension element support 26. The left-hand space of 32, which is attached to the rigid high cross member 18 and precisely anchored to the left-hand internal face 28 near to the upper portion 36 forming a cover and opposite the external face, prevents rotation of the left-hand bell-shaped suspension element support 26. Consequently, the penetration of same into the passenger compartment is also prevented and compression of the side member is stabilized in the longitudinal axis of same.

Furthermore, the force Ef exerted longitudinally on the left-hand side member 22 may also result in the left-hand bell-shaped suspension element support 26 being driven in translation F along a vertical axis. Again in this case, the left-hand spacer 32, which is rigidly connected to the cross member 18, causes the translational forces to be absorbed by the cross member 18.

Furthermore, the spacers 32, 34 generate improved acoustically dynamic "iso-stiffness", improved static stiffness and improved endurance strength under spring-plus-shock-absorber stresses.

Furthermore, the spacers 32, 34 occupy a limited volume and as such it is easier to perform ceiling work and in particular to apply mastic or corrosion-prevention treatments to the surfaces. Moreover, the upper portion 36 forming a cover is left free, which allows same to be ribbed. This provides endurance strength equivalent to a thicker upper portion that is not ribbed. This results in a significant increase in mass.

The invention claimed is:

1. A motor vehicle structure for a motor vehicle including a front compartment having side walls and a passenger compartment that is separated from said front compartment by a bulkhead, said bulkhead having a rigid cross member, said structure comprising:
    left and right bell-shaped suspension element supports arranged inside said front compartment close to said bulkhead, and that are respectively adjacent to said side walls, each of the bell-shaped suspension element supports including an internal face opposite the side wall; and
    left and right spacers that extend respectively between said left and right bell-shaped suspension element supports and said rigid cross member, in a substantially longitudinal direction,
    wherein said spacers are respectively anchored to the internal faces of said left and right bell-shaped suspension element supports,
    wherein said spacers each have a skirt-shaped edge that can be applied to said bell-shaped suspension element supports, and a folded edge extending between a free end and an opposing attachment end that is configured to be joined to said cross member, said spacers including a central portion joining said folded edge and said skirt-shaped edge together, and
    wherein an overall shape of the central portion of said spacers is substantially triangular.

2. The motor vehicle structure as claimed in claim 1, wherein said bell-shaped suspension element supports include respectively an upper portion forming a cover, and said spacers are anchored near to said upper portions forming a cover.

3. The motor vehicle structure as claimed in claim 1, wherein said bell-shaped suspension element supports are rigidly connected to said side walls respectively.

4. The motor vehicle structure as claimed in claim 1, wherein said folded edge of said spacer includes a curved portion that is located towards said free end and that extends substantially perpendicular to said skirt-shaped edge.

5. The motor vehicle structure as claimed in claim 4, wherein said attachment end includes a perforated tab extending substantially perpendicular to said curved portion.

6. The motor vehicle structure as claimed in claim 1, wherein said spacers are formed from a single piece of pressed metal.

7. The motor vehicle structure as claimed in claim 1, wherein said spacers extending respectively between said left and right bell-shaped suspension element supports and said cross member are mirror images of one another.

8. The motor vehicle structure as claimed in claim 1, wherein said attachment end includes a perforated tab extending substantially perpendicular to a curved portion of said folded edge of said spacer.

9. The motor vehicle structure as claimed in claim 8, wherein said perforated tab is oriented substantially vertically and transversely.

10. The motor vehicle structure as claimed in claim 1, wherein said attachment end is welded to said cross member.

11. The motor vehicle structure as claimed in claim 1, wherein said skirt-shaped edge of each of said spacers is rigidly attached to said bell-shaped suspension element supports.

12. The motor vehicle structure as claimed in claim 6, wherein said metal that forms said spacers is steel.

* * * * *